United States Patent
Andreev et al.

(10) Patent No.: US 8,364,957 B2
(45) Date of Patent: Jan. 29, 2013

(54) SYSTEM AND METHOD OF PROVIDING CREDENTIALS IN A NETWORK

(75) Inventors: Dmitry Andreev, Larchmont, NY (US); Gregory Vilshansky, Chappaqua, NY (US); Boris Vishnevsky, Wayne, PA (US)

(73) Assignee: International Business Machines Corporation, Armonk, NY (US)

(*) Notice: Subject to any disclaimer, the term of this patent is extended or adjusted under 35 U.S.C. 154(b) by 2051 days.

(21) Appl. No.: 10/791,322

(22) Filed: Mar. 2, 2004

(65) Prior Publication Data

US 2005/0198501 A1    Sep. 8, 2005

(51) Int. Cl.
H04L 9/32    (2006.01)
(52) U.S. Cl. ............................. 713/168; 726/8
(58) Field of Classification Search .................. 713/168, 713/172, 175, 182, 185
See application file for complete search history.

(56) References Cited

U.S. PATENT DOCUMENTS

| | | | |
|---|---|---|---|
| 5,497,421 A * | 3/1996 | Kaufman et al. ............. 713/156 |
| 5,838,812 A | 11/1998 | Pare, Jr. et al. |
| 6,374,359 B1 * | 4/2002 | Shrader et al. .................... 726/5 |
| 6,539,482 B1 * | 3/2003 | Blanco et al. ..................... 726/7 |
| 6,609,198 B1 | 8/2003 | Wood et al. |
| 6,807,181 B1 * | 10/2004 | Weschler ........................ 370/400 |
| 6,877,095 B1 * | 4/2005 | Allen ............................ 713/182 |
| 7,016,959 B2 * | 3/2006 | Dinh et al. ..................... 709/225 |
| 7,024,690 B1 * | 4/2006 | Young et al. ....................... 726/5 |
| 7,290,288 B2 * | 10/2007 | Gregg et al. ..................... 726/28 |
| 2002/0007460 A1 * | 1/2002 | Azuma ........................... 713/201 |
| 2002/0116646 A1 | 8/2002 | Mont et al. |
| 2002/0116647 A1 | 8/2002 | Mont et al. |
| 2002/0156905 A1 * | 10/2002 | Weissman ..................... 709/229 |
| 2003/0005308 A1 * | 1/2003 | Rathbun et al. ............... 713/185 |
| 2003/0033535 A1 * | 2/2003 | Fisher et al. .................. 713/185 |
| 2003/0033545 A1 | 2/2003 | Wenisch et al. |
| 2003/0055935 A1 | 3/2003 | Tarrant et al. |
| 2003/0056092 A1 * | 3/2003 | Edgett et al. .................. 713/153 |
| 2003/0056096 A1 | 3/2003 | Albert et al. |
| 2003/0065626 A1 | 4/2003 | Allen |
| 2003/0065919 A1 | 4/2003 | Albert et al. |
| 2003/0115341 A1 | 6/2003 | Sinha et al. |
| 2004/0003081 A1 * | 1/2004 | Justus et al. .................. 709/225 |
| 2004/0054898 A1 * | 3/2004 | Chao et al. .................... 713/168 |
| 2005/0015490 A1 * | 1/2005 | Saare et al. ................... 709/225 |

* cited by examiner

Primary Examiner — Kambiz Zand
Assistant Examiner — Amare F Tabor
(74) Attorney, Agent, or Firm — Matthew Chung; Roberts Mlotkowski Safran Cole, P.C.

(57) ABSTRACT

A method and system is provided to provide single sign on (SSO) functionality in a network that avoids storing a user's credentials in persistent storage. A session may be initiated with a portal which sends a session ID derivative as a credential string instead of a user's password to a target application. When the target application attempts to authenticate the user, by sending a request to a LDAP directory, the request is intercepted by a LDAP proxy that instead validates the UserID with the LDAP directory and the password is validated by a credential validator component which verifies with the portal that the credential string presented as the user password has been produced from the active session ID. In an embodiment, the credential string validator validates each short-living credential only once and upon detecting a second validation request for the same string, initiates a security breech process. A target application proxy may also be employed to terminate all sessions with the UserID when duplicate session requests occur.

21 Claims, 5 Drawing Sheets

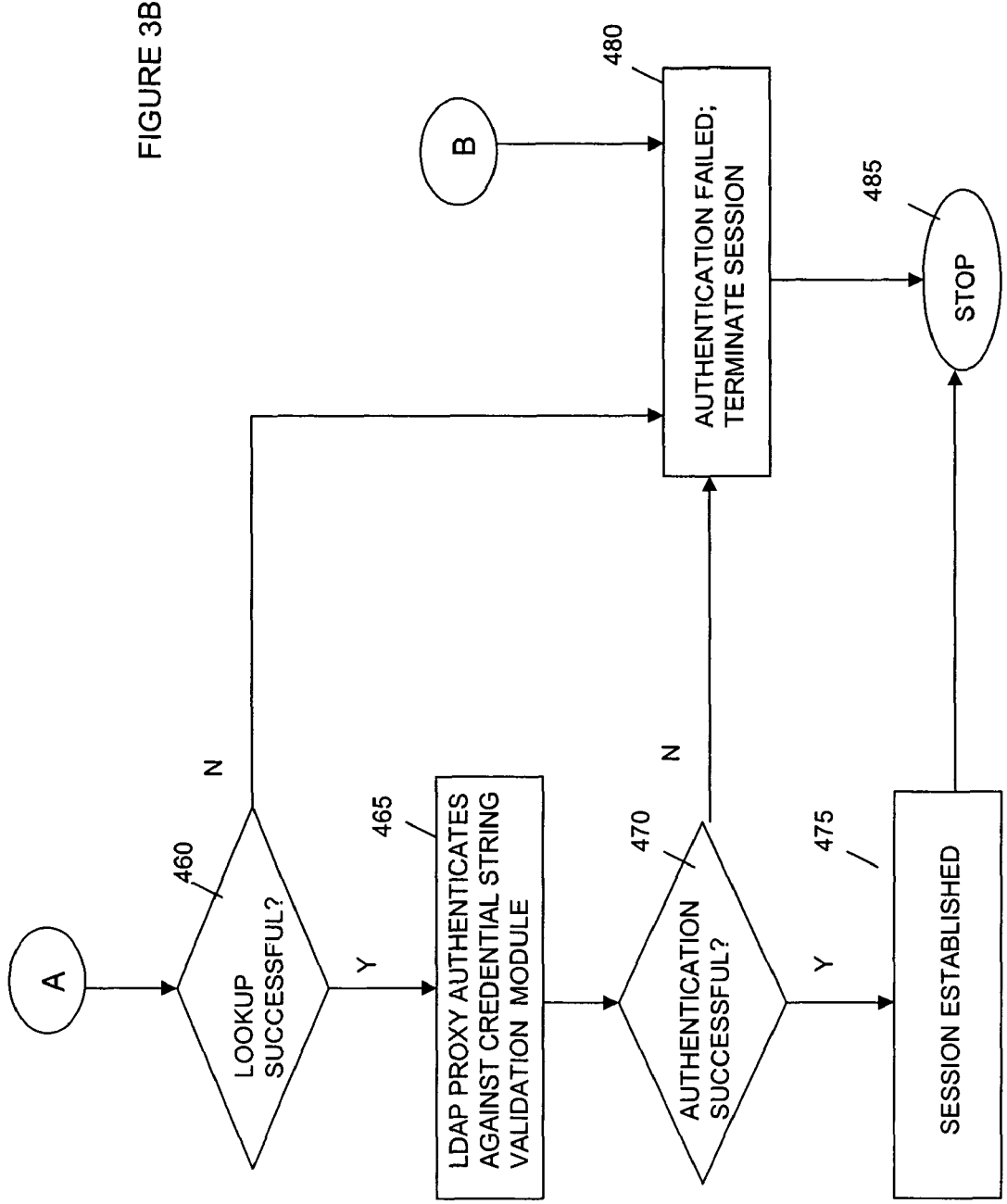

SYSTEM AND METHOD OF PROVIDING CREDENTIALS IN A NETWORK

BACKGROUND OF THE INVENTION

1. Field of the Invention

The invention generally relates to a system and method of providing credentials in a network, in particular, providing short living credentials to a target application without using persistent memory.

2. Background Description

Providing friendly and simplified access to networks may often be at odds with providing protection of a user's identity and password(s). Security breaches have become a significant problem in networks when fraudulent acquisition of users' identities and passwords occurs. Fraudulent access to network resources has caused a plethora of damage which has forced network and application providers to increase security methods and measures.

Spoofing a user's identity has been a constant threat and often occurs while an authentic user is accessing a network resource. When authentication parameters are in the process of being analyzed and/or validated, an opportunity may exist for a security breach. Avoiding a security breach and detecting when a security breach has occurred has been an ongoing endeavor. However, security breaches are still prevalent.

For example, in a network system, to provide single sign on (SSO) functionality, a portal server may need to submit a user's ID and password to other applications. Storing the user's confidential information in a persistent storage inherently poses a security threat since the information would be present for potential unauthorized access.

Furthermore, many security standards require that passwords are not stored in non-persistent memory longer than it is absolutely necessary to perform the user authentication, i.e., password image in memory must be destroyed immediately after its has been used. Thus, even in the case when the target application (TA) uses the same information as those used by the portal, and the logon to the TA does not happen immediately after logon to the portal, but rather at the time of the end user's choosing, to provide a secure SSO mechanism, a solution without storing user's information in memory is highly desirable.

Creation of a security process that avoids inordinate exposure of a user's confidential password to downstream network resources would be a desirable improvement to network security. Further, if authentication of a user during significant stages of network access is capable of detecting a fraudulent use of a user's information, then an increase in overall security may be achieved.

SUMMARY OF THE INVENTION

In an aspect of the invention, a method is provided for authentication in a network. The method comprises creating a credential string which is derived from a session ID, and sending a UserID associated with the session ID and the credential string to a software application. The method also includes receiving a confirmation request which includes the credential string from an authentication proxy, and sending a response in reply to the confirmation request to the authentication proxy based upon the validity of the credential string.

In another aspect of the invention a method for authenticating a user request for a software application is provided. The method comprises the steps of receiving a UserID and credential string at an authentication proxy server and sending a confirmation request from the authentication proxy to a portal, the confirmation request includes the credential string. The method further includes the steps of receiving a response at the authentication proxy for the confirmation request and validating the UserID using a light weight directory access protocol (LDAP) lookup request and the response.

In another aspect of the invention, a system for authenticating a session is provided. The system comprises an authentication proxy which receives requests to authenticate a UserID and credential string and a credential string validation component which receives requests to validate the credential string, wherein the credential string validation component checks whether the credential string has been previously received for validation within a predetermined time period.

In another aspect of the invention, a computer program product is provided comprising a computer usable medium having readable program code embodied in the medium and including at least one program code to create a credential string which is derived from a session ID, send a UserID associated with the session ID and the credential string to a software application, receive a confirmation request which includes the credential string from an authentication proxy and send a response in reply to the confirmation request to the authentication proxy based upon the validity of the credential string.

BRIEF DESCRIPTION OF THE DRAWINGS

FIGS. 3A and 3B are flow diagrams showing steps of an embodiment of the invention.

DETAILED DESCRIPTION OF EMBODIMENTS OF THE INVENTION

This invention is directed to a system and method of providing authentication to applications without using persistent memory to jeopardize the security of the authentication process. In one aspect, this is accomplished by using a short-living credential string, generated by and verifiable by a portal, for authenticating a user to a target application (TA). For example, in a scenario when a system integrator, or the like, has access to the link between the TA and its authentication authority (e.g., a lightweight directory access protocol (LDAP) server), a secure solution based on an intelligent proxy server is provided. By using the invention, the need for exposing a user's password to network resources beyond a portal may be avoided.

Figure 1A:
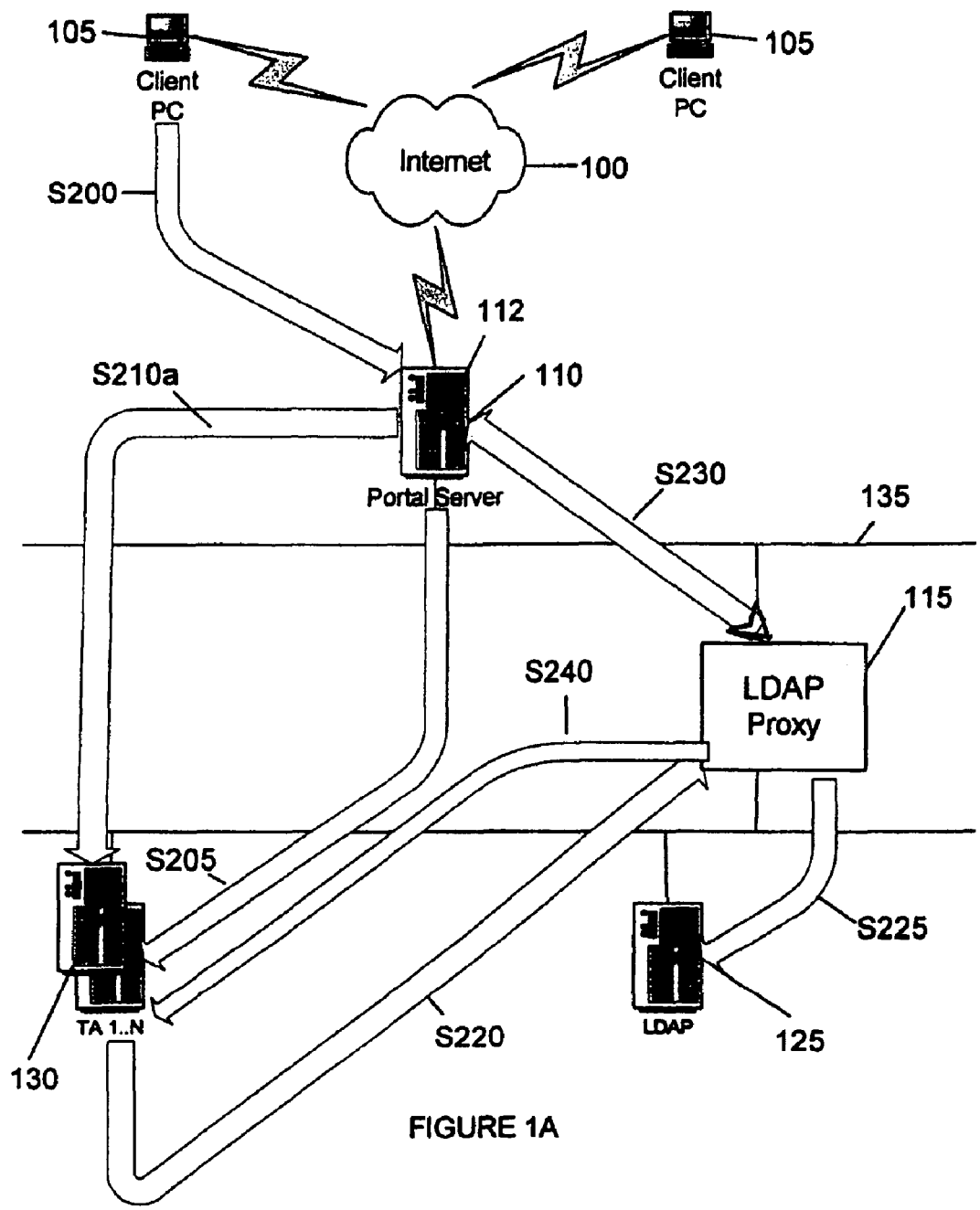
FIG. 1A is a block diagram showing components of an embodiment of the invention.
Figure 1B:
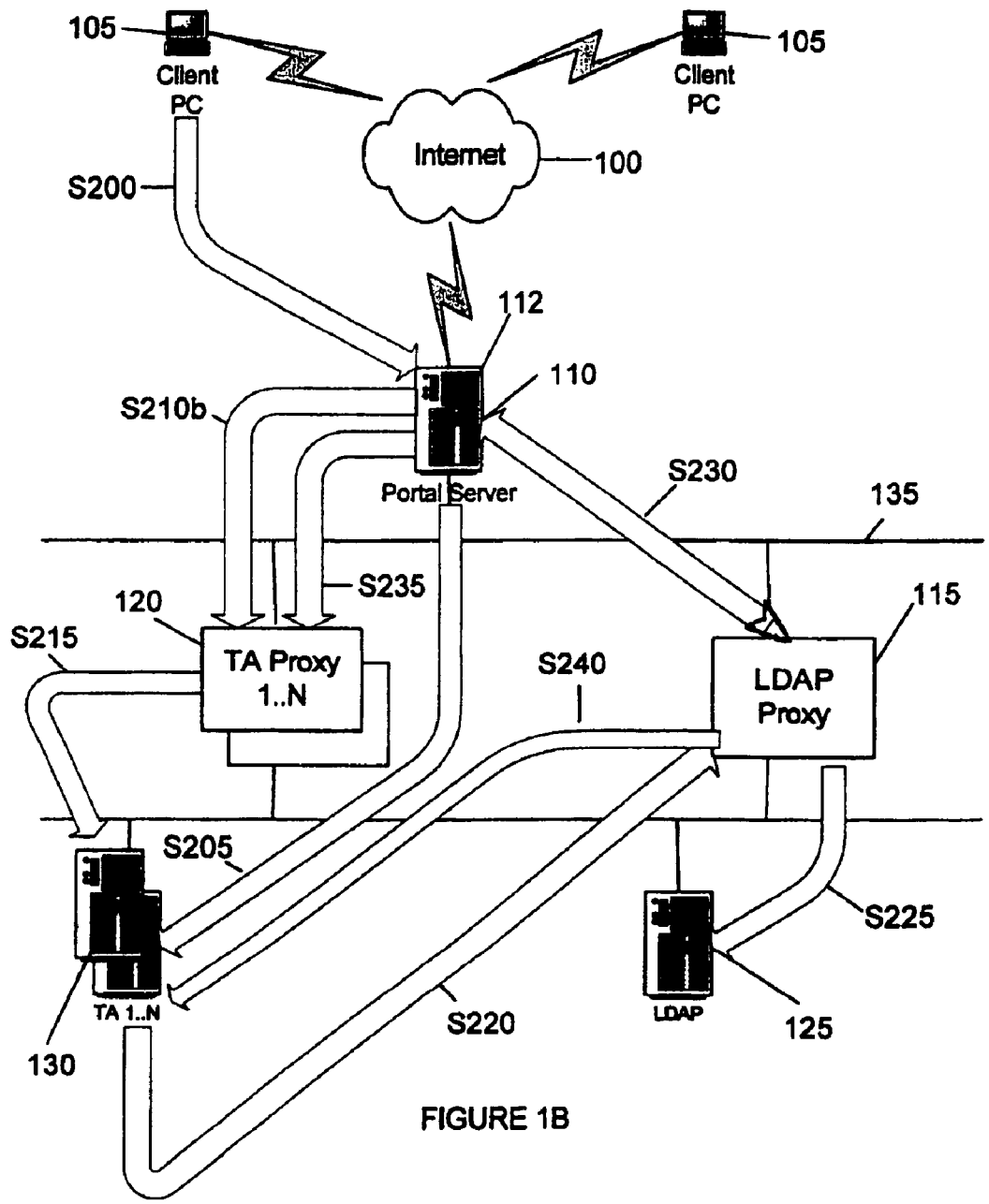
FIG. 1B is a block diagram showing components of an embodiment of the invention.

FIGS. 1A and 1B is an exemplary block diagram showing components of an embodiment of the invention. FIGS. 1A and 1B may also be a flow chart illustrating steps of using the invention. The steps are indicated by reference numerals S200-S240, as explained below.

The embodiment of FIG. 1A includes a network 100 (such as, for example, the Internet) connecting one or more client computers 105 (e.g., a personal computer (PC)) with a portal server 110, which typically includes an application containing at least a personalized page of links to target applications. Portals may include pages containing data dynamically collected from target applications. The portal server 110 may also include a credential string validator 112, explained below. The portal server 110 may be in communication with at least one LDAP Proxy 115 for authentication purposes. In general, the proxy server, e.g., 115, which may include a software module that intercepts session communications between a client module (e.g., a module on client 105) and a server module (e.g., TA 130 or LDAP 125), may be capable of either passing requests and responses through, or performing an additional processing and/or modification of requests and/or responses. The proxy server may be transparent to both the client and the server modules.

The LDAP Proxy 115 may be in communication with the LDAP server 125. The TAs 130 may include an IP network product requiring user authentication and session tracking. The TAs 130 may be in communication with the LDAP Proxy 115. The interconnectivity among these components (e.g., 110, 115, 125, and 130) may be accomplished using one or more network(s) 135, which may be a local area network (LAN), a wide-area network (WAN), or the like.

In an aspect of the invention, a session may include a sequence of HTTP requests (or similar protocol requests) and responses traversing between a client browser on a client computer (e.g., 105) and a target application (e.g. 110) or a portal server (e.g. 130), beginning with sign-on and ending with either closing of a browser window or an explicit logoff operation. A logon by a user may include a client authentication, involving entering user-specific credentials, examples of which are a user ID and a password, for the purpose of gaining access to a target application (e.g., 130). A single sign-on (SSO) typically may include functionality that allows a user to access target applications (e.g., 130) linked to the portal (e.g., 110) without re-entering target application specific information such as, for example, user ID and password during a session initiated by successful authentication of the user with the portal. In use, the password is not propagated through the system to verify and authenticate the user's access. Instead, a credential string is used in order to provide additional security to the system. In one embodiment, the credential string may be a hash of the session ID, which may be encrypted.

By way of example, and referring to FIG. 1A, at step S200, a user successfully logs onto the portal 110 from a client computer 105, and wishing to initiate a session with a TA 130 (usually by clicking the appropriate URL link within the client browser). At step S210a, the portal 110 sends a session ID derivative (e.g., a hash of the session ID) as a credential string, instead of the user's password to the TA 130. At step S220, the TA 130 tries to authenticate the user, e.g., by sending a BIND request to a LDAP directory specifying the received credential string as the LDAP required parameter. The LDAP Proxy 115 intercepts the BIND request and validates (i.e., authenticates) the user's credentials.

At step S225, the UserID is validated via a LDAP 125 lookup request. At step S230, the password is validated via the credential string validator component 112, which upon receiving the password validation request from the LDAP proxy 115, confirms with the portal 110 that the credential string presented has been actually produced from the active session ID, and the session belongs to the same user. At step S240, the LDAP proxy 115 returns an authentication confirmation (e.g., "BIND successful") to the TA 130 if both the credential string and UserID are independently confirmed. The arrows of FIG. 1A and 1B associated with steps S200-S240 may also be considered bi-directional communication paths.

For general security considerations, a new credential string must be generated by the portal 110 for every user's request to access a TA. Since, in some portal implementations, the session ID may be reconstructed from HTTP traffic between the portal and the client browser, it may be necessary to use encryption when producing the credential string based on session ID. In some network configurations and situations, it may be possible for an intruder to intercept the short-living credential string in transit between the portal 110 and the TA 130. Therefore, the communications between the portal server 110 and the TA 130 may optionally use an encrypted transport layer. A password, however, is no longer required to propagate throughout the network, in accordance with the invention.

FIG. 1B is a block diagram showing components of an embodiment of the invention. This embodiment includes at least one TA Proxy 120 in addition to the components of FIG. 1A. The TA Proxy 120 may be a software component resident in the one or more TAs 130 or in any other suitable server. The at least one TA Proxy 120 is in communication with the one or more TA's 130 and the portal server 110.

By way of example, and referring to FIG. 1B, to further improve security, at step S200, a user successfully logs on to the portal 110 from a client computer 105 and wishes to initiate a session with a TA 130 (usually by clicking the appropriate URL link within the client browser). At step S210b, the portal 110 sends a session ID derivative as a credential string and UserID, produced as an encrypted hash of the active user's session ID, to the TA Proxy 120 where the TA Proxy checks whether the UserID and credentials have been received recently (i.e., a predetermined time period). If not received recently, then at step S215, the UserID and credential string are sent to the TA 130. If, however, the UserID and credential string have been recently received and, at step 235, a second request with the same UserID and credential string is received by TA Proxy 120, procedures associated with a network security breach may be initiated. The procedures may include terminating all the sessions authenticated by the compromised credential string.

At step S220, the TA 130 attempts to authenticate the user, e.g., by sending a BIND request to a LDAP directory specifying the received credential string as the LDAP password. The LDAP Proxy 115 intercepts the BIND request and validates (i.e., authenticates) the user's credentials. At step S225, the UserID may be validated via a LDAP 125 lookup request. At step S230, the password is validated via the credential string validator component 112, which upon receiving the password validation request from the LDAP proxy 115, confirms with the portal 110 that the credential string, presented instead of the user's password, has been actually produced from the active session ID, and the session belongs to the same user. The credential string validator module 112 validates each short-living credential string only once, and upon detecting a second validation request for the same credential string, sends a message to the TA proxy 120 informing it about the attempt to breach security (e.g., short-living credential being intercepted). The credential string validator module 112 may also initiate any procedures typically associated with a network security breach. Typically, the TA proxy 120 immediately terminates all the sessions authenticated by the compromised credential string in such instances.

Two security breach situations may be typical: (a) more probable, an authentication request to the TA, initiated by an intruder using a spoofed credential string, may be served after an "already-in-progress" authentication request from the portal 110, and (b) a situation may be possible where the authentication request to the TA 130, initiated by the intruder using a spoofed credential string, may be served before the "already-in-progress" authentication request from the portal 110. In situation (a), the intruder's session is not initiated. In situation (b), the intruder may be able to initiate a user session with the TA 130. However, in the scenario of (b), the session still terminates when the "already-in-progress" authentication request from the portal 110 is presented to the credential string validator module 112 by the second requestor.

Using the Invention

Figure 2:
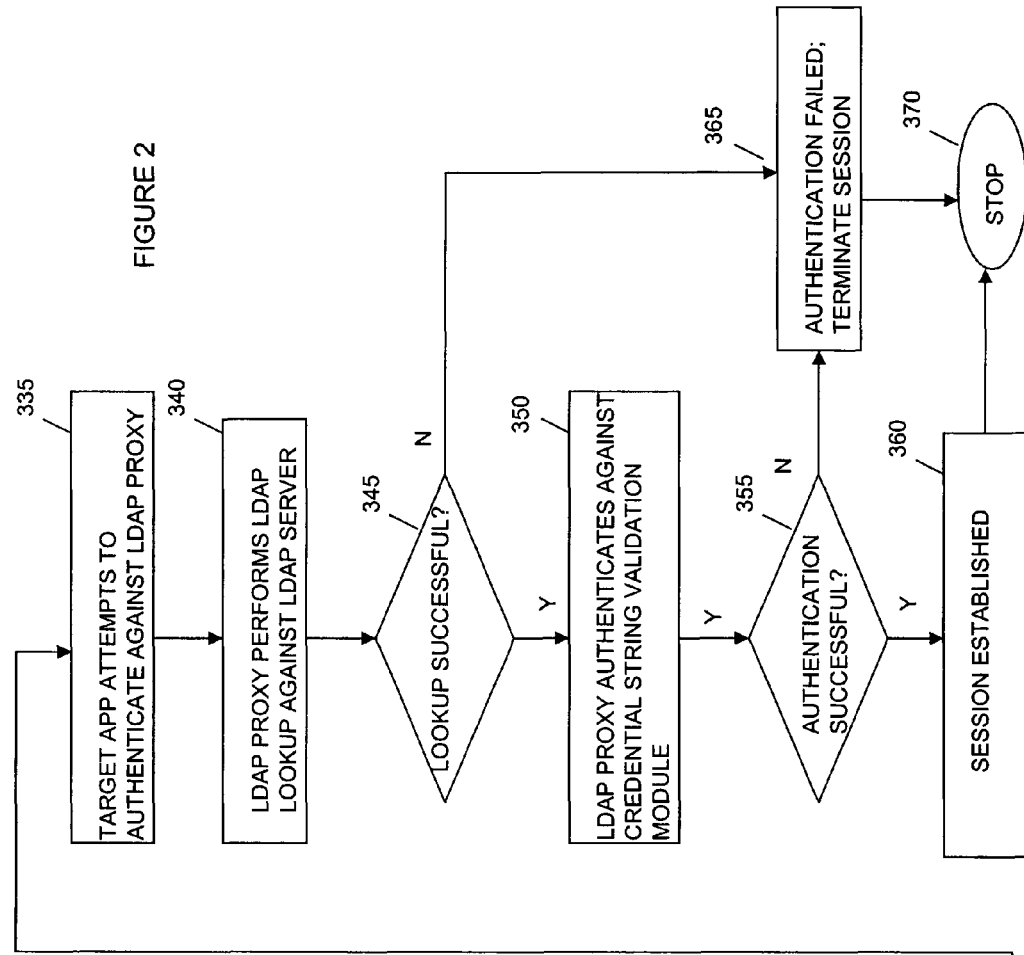
FIG. 2 is a flow diagram showing steps of an embodiment of the invention.
Figure 2:
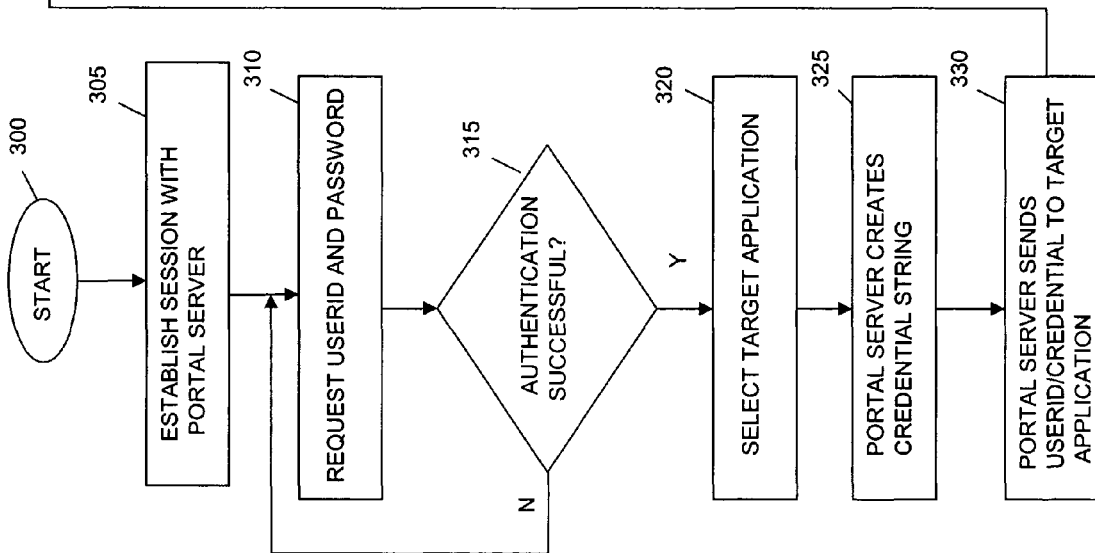

FIG. 2 is a flow diagram showing steps of an embodiment of the invention, starting at step 300. FIG. 2 as well as FIGS. 3A and 3B, may equally represent a high-level block diagram of components of the invention implementing the steps thereof. The steps of FIGS. 2-3B may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Continuing with the flow of FIG. 2, at step 305, a user establishes a session with a portal server. At step 310, a request is made to obtain the UserID and password from the user. At step 315, an authentication check is made by the portal to determine whether the UserID and password is valid. If not valid, another request is made at step 310. Otherwise, if successful, at step 320, the user chooses an application which may be from a list presented in the user's browser.

At step 325, the portal creates a credential string as a hash of user's SessionID. At step 330, the portal server sends the UserID and credential string to the target application selected by the user. At step 335, the target application attempts to authenticate (e.g., a BIND request) against the LDAP Proxy server by sending the UserID and the credential string to the LDAP Proxy. At step 340, the LDAP proxy performs LDAP lookup against the LDAP server for the UserID.

At step 345, a check is made whether the lookup was successful. If not successful, at step 365 the session is terminated. Otherwise, if successful, at step 350, the LDAP proxy authenticates the credential string against a credential string validation module. At step 355, a check is made whether the check is successful and, if not, at step 365, the authentication fails and the session is terminated. Otherwise if successful, at step 360, the session is established (e.g., a "BIND Successful" returned to the target application). The process completes at step 370.

Figure 3A:
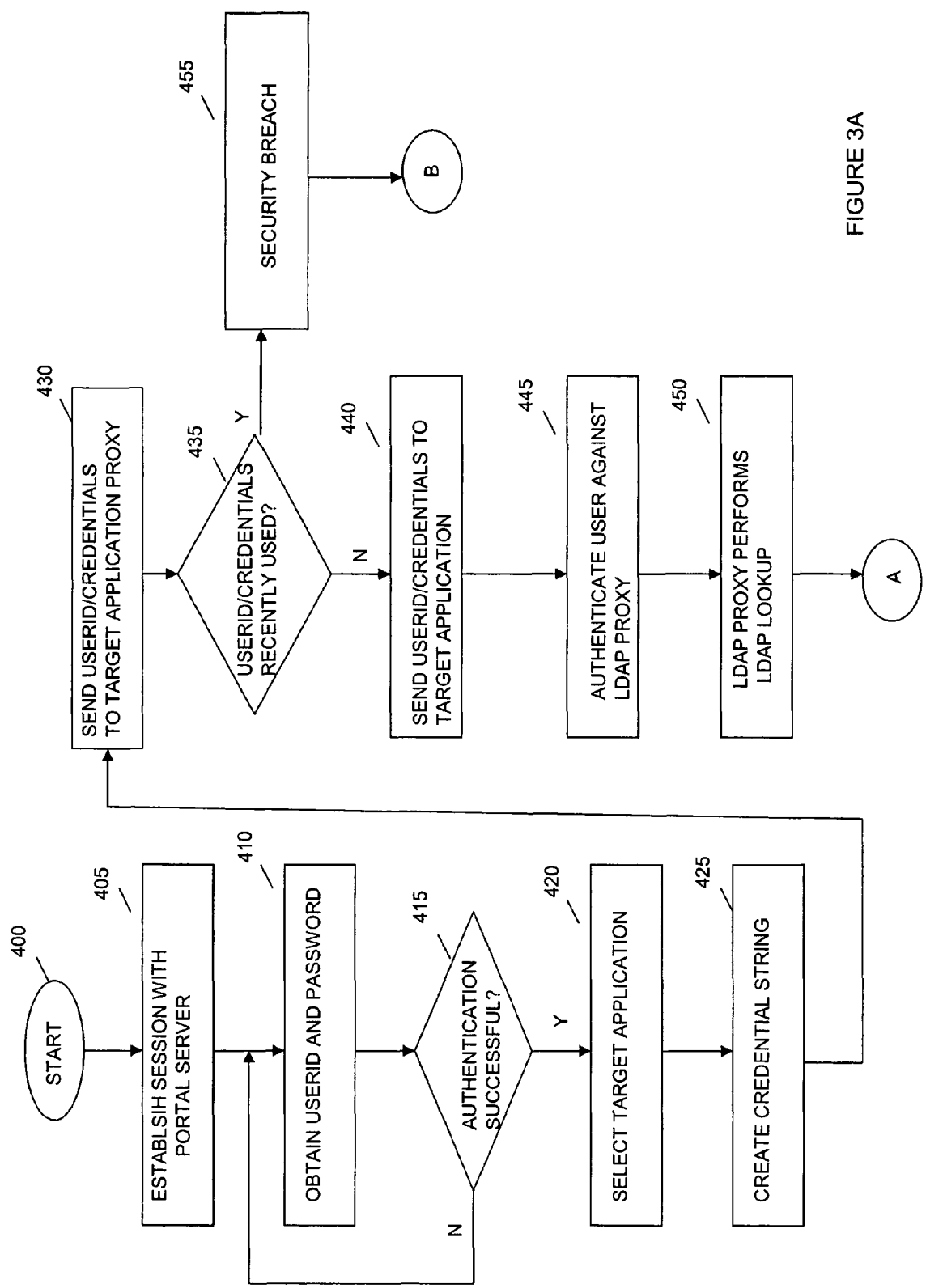

Referring to FIGS. 3A and 3B, a process starts at step 400. At step 405, a user establishes a session with a portal server. At step 410, a request to obtain the UserID and password from the user is presented. At step 415, a check is made to authenticate the password and UserID. If the authentication fails, then the request is re-issued at step 410. Otherwise, if successful, at step 420, the user selects a target application which may be from a list presented in the browser.

At step 425, the portal creates a credential string as a hash of the user's sessionID. At step 430, the portal server sends the UserID and credential string to the target application proxy. At step 435, the target application proxy intercepts the UserID and credential string and checks whether the UserID and credential string has been recently used. The time period to determine whether it has been recent is an alterable parametric that may have a wide range of values suitable for a wide-range of network operations, for example, from a few milliseconds to several minutes or hours/days. If recently used, then at step 455, a security breach is initiated. If not recently used, then at step 440, the target application proxy sends UserID and credential string to the selected target application.

At step 445, the target application attempts to authenticate the user against the LDAP server by sending the UserID and credential string to the LDAP proxy. At step 450, the LDAP proxy performs a LDAP lookup against the LDAP server to validate the UserID. At step 460, if the lookup is successful, then at step 465, the LDAP proxy authenticates the credential string by sending it to the credentials validation module typically associated with the portal server. If the authentication succeeds, then at step 475, a "BIND successful" response is sent to the target application and the session is established between user and target application.

If at step 460, the lookup is unsuccessful, or if, at step 470, the authentication is unsuccessful, or a security breach at step 480, a bad credentials message is returned and the session(s) with the UserID is/are terminated.

While the invention has been described in terms of embodiments, those skilled in the art will recognize that the invention can be practiced with modifications and in the spirit and scope of the appended claims.

What is claimed is:

1. A method for authentication in a network, the method comprising:
    creating a credential string on a portal server, the credential string being an encrypted hash of a session ID;
    sending a UserID associated with the session ID and the credential string to a software application from the portal server, while maintaining the user password on the portal server and avoiding exposing the user password to network resources beyond the portal server;
    receiving a confirmation request from the software application to an LDAP proxy while maintaining the user password on the portal server such that the user password is not required to authenticate the User ID, the confirmation request including the credential string; and
    sending a response from the LDAP proxy in reply to the confirmation request to validate the credential string to authenticate the UserID, wherein:
    user access to the software application is linked to the portal server without re-entering software application information including a username and password during a session initiated by a successful authentication; and
    a new credential string is generated by the portal server for each request to access the software application.

2. The method of claim 1, wherein the encrypted hash of the session ID is a derivate of the session ID.

3. The method of claim 1, further comprising the steps of:
    performing a lightweight directory access protocol (LDAP) lookup using the UserID; and
    if the LDAP lookup confirms the UserID and the response validates the credential string, returning a successful authentication reply to the software application for establishing a session associated with the session ID, otherwise sending an unsuccessful authentication reply to the software application.

4. The method of claim 1, wherein the sending of a UserID and the credential string avoids at least one of sending a user's password outside of a portal server and storing the password in persistent memory.

5. The method of claim 1, further comprising the steps of:
    sending the UserID associated with the session ID and the credential string to a software application proxy;
    checking whether the session ID and the credential string have been previously received within a predetermined time period; and
    if affirmative, initiating a security breach procedure.

6. The method of claim 5, wherein the security breach procedure causes the termination of any session associated with the UserID.

7. The method of claim 1, wherein the receiving step and sending a response step is performed by an authentication proxy.

8. A method for authenticating a user request for a software application, the method comprising:
- receiving a UserID and a credential string at an authentication proxy server, the credential string being an encrypted hash of a session ID, which is created at a portal;
- sending a confirmation request from the authentication proxy to the portal while maintaining the user password on the portal and avoiding exposing the user password to network resources beyond the portal, the confirmation request includes the credential string;
- receiving a response at the authentication proxy for the confirmation request while maintaining the user password on the portal such that the user password is not required to authenticate the User ID; and
- validating the UserID using a light weight directory access protocol (LDAP) lookup request and the response, wherein:
  - user access to a software application is linked to the portal without re-entering software application information including a username and password during a session initiated by a successful authentication; and
  - a new credential string is generated by the portal for each request to access the software application.

9. The method of claim 8, further comprising providing a confirmation to the software application if the response is affirmative and the UserID is authenticated by the LDAP lookup.

10. The method of claim 9, further comprising validating the confirmation request by assuring that the credential string has been received only once for confirmation at the portal, otherwise, if presented more than once, performing at least one of initiating a security breach procedure and notifying a software application proxy.

11. The method of claim 8, further comprising receiving the UserID and the user password during a logon to the portal, wherein the UserID is validated in the validating step and the user password is maintained at the portal and used to process the confirmation request.

12. A system for authenticating a session stored on a computer readable storage memory device, comprising computer readable program code, comprising:
- an authentication proxy which receives requests to authenticate a UserID and a credential string, the credential string being an encrypted hash of a session ID and created on a portal; and
- a credential string validation component which receives requests to validate the credential string while maintaining a user password on the portal such that the user password is not required to validate the credential string, wherein:
  - the credential string validation component checks whether the credential string has been previously received for validation within a predetermined time period while maintaining the user password on the portal and avoiding exposing the user password to network resources beyond the portal;
  - user access to a software application is linked to the portal without re-entering software application information including a username and password during a session initiated by a successful authentication; and
  - a new credential string is generated by the portal for each request to access the software application.

13. The system of claim 12, wherein the authentication proxy performs lightweight directory access protocol (LDAP) lookups using the UserID and sends the credential string to the credential string validation component and receives a validation reply.

14. The system of claim 13, wherein the authentication proxy sends an affirmative authentication reply to a software application when both the LDAP lookup is successful and the validation reply indicates a valid credential string.

15. The system of claim 14, wherein the authentication proxy receives the UserID and credential string from a software application.

16. The system of claim 12, further comprising a software application proxy which receives the UserID and the credential string and detects whether the UserID and the credential string have been previously received within a predetermined time period.

17. The system of claim 12, further comprising:
- a lightweight directory access protocol (LDAP) directory for authenticating the UserIDs and which is accessible by the authentication proxy; and
- a software application proxy for intercepting the UserID and the credential string sent by the portal for monitoring duplicate occurrences of the UserID and the credential string.

18. A computer program product comprising a computer usable memory device having readable program code embodied in the memory device, the computer program product including at least one program code to:
- create a credential string on a portal server, the credential string being an encrypted hash of a session ID;
- send a UserID associated with the session ID and the credential string to a software application from the portal server, while maintaining the user password on the portal server and avoiding exposing the user password to network resources beyond the portal server;
- receive a confirmation request from the software application to an LDAP proxy while maintaining the user password on the portal server such that the user password is not required to authenticate the User ID, the confirmation request including the credential string; and
- send a response from the LDAP proxy in reply to the confirmation request to validate the credential string to authenticate the UserID, wherein:
  - user access to the software application is linked to the portal server without re-entering software application information including a username and password during a session initiated by a successful authentication; and
  - a new credential string is generated by the portal server for each request to access the software application.

19. The system of claim 12, wherein the UserID and the credential string are sent to a software application when the predetermined time period has elapsed.

20. The system of claim 19, wherein a network security breach is initiated when a second request to validate the credential string occurs within the predetermined time period of a first request to validate the credential string.

21. The system of claim 20, wherein the portal is configured to accept a logon by a user and create the credential string from an associated session ID.

* * * * *